US010698807B2

(12) United States Patent
Jo et al.

(10) Patent No.: US 10,698,807 B2
(45) Date of Patent: Jun. 30, 2020

(54) COMPUTER SYSTEM AND METHOD OF OPERATING THE SAME

(71) Applicant: SAMSUNG ELECTRONICS CO., LTD., Suwon-si, Gyeonggi-do (KR)

(72) Inventors: In-soon Jo, Hwaseong-si (KR); Sang-yeun Cho, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 87 days.

(21) Appl. No.: 15/649,848

(22) Filed: Jul. 14, 2017

(65) Prior Publication Data

US 2018/0137044 A1     May 17, 2018

(30) Foreign Application Priority Data

Nov. 16, 2016  (KR) .................. 10-2016-0152965

(51) Int. Cl.
  *G06F 12/02*  (2006.01)
  *G06F 13/16*  (2006.01)

(52) U.S. Cl.
  CPC ...... *G06F 12/0238* (2013.01); *G06F 12/0246* (2013.01); *G06F 13/1694* (2013.01); *G06F 12/0292* (2013.01); *G06F 2212/202* (2013.01); *G06F 2212/7202* (2013.01)

(58) Field of Classification Search
  CPC .................. G06F 12/0238; G06F 13/1694
  USPC ....................................... 365/145
  See application file for complete search history.

(56) References Cited

U.S. PATENT DOCUMENTS

| 7,979,663 | B2 | 7/2011 | Tomonaga | |
|---|---|---|---|---|
| 8,447,945 | B2 | 5/2013 | Nishikawa | |
| 8,724,389 | B2 | 5/2014 | In | |
| 8,850,105 | B2 | 9/2014 | Hida et al. | |
| 9,032,099 | B1 | 5/2015 | Parra et al. | |
| 9,116,622 | B2 | 8/2015 | Suzuki et al. | |
| 2008/0155160 | A1* | 6/2008 | McDaniel | G06F 13/4027 710/306 |
| 2008/0162792 | A1* | 7/2008 | Wu | G06F 12/0246 711/103 |
| 2009/0172257 | A1* | 7/2009 | Prins | G06F 13/1657 711/103 |
| 2010/0023682 | A1* | 1/2010 | Lee | G06F 12/0246 711/103 |
| 2013/0246722 | A1* | 9/2013 | Suzuki | G06F 3/0608 711/162 |
| 2015/0331790 | A1 | 11/2015 | Kishi et al. | |

FOREIGN PATENT DOCUMENTS

JP      2010-237907 A      10/2010

* cited by examiner

*Primary Examiner* — Huan Hoang
*Assistant Examiner* — Muna A Techane
(74) *Attorney, Agent, or Firm* — Lee IP Law, PC

(57) ABSTRACT

A computer system includes a main memory device and a processor. The main memory device includes a non-volatile memory and a memory controller to control the non-volatile memory. The processor is connected to the main memory device, executes an application program loaded to the non-volatile memory, and provides the memory controller with a command including context property information of an allocation region. The memory controller receives the command and controls the non-volatile memory based on the context property information.

16 Claims, 9 Drawing Sheets

| START ADDRESS OF ALLOCATION REGION | SIZE OF ALLOCATION REGION | CONTEXT PROPERTY INFORMATION | | | | | |
|---|---|---|---|---|---|---|---|
| | | EFFECTIVE PERIOD PROPERTY | SEQUENTIAL/NON-SEQUENTIAL ACCESS PROPERTY | EXPANSION/NON-EXPANSION PROPERTY | VALID/INVALID PROPERTY | SECURITY PROPERTY | SPEED PROPERTY |
| a1 | s1 | TEMPORARY | NON-SEQUENTIAL | NON-EXPANSION | VALID | | |
| a2 | s2 | ONE DAY | NON-SEQUENTIAL | NON-EXPANSION | VALID | | |
| a3 | s3 | ONE DAY | NON-SEQUENTIAL | NON-EXPANSION | VALID | | |
| a4 | s4 | TEMPORARY | NON-SEQUENTIAL | NON-EXPANSION | VALID | | |
| a5 | s5 | TEMPORARY | NON-SEQUENTIAL | NON-EXPANSION | VALID | | |
| a6 | s6 | PERMANENT | NON-SEQUENTIAL | NON-EXPANSION | VALID | | |
| a7 | s7 | TEMPORARY | NON-SEQUENTIAL | NON-EXPANSION | VALID | | |
| a8 | s8 | ONE DAY | NON-SEQUENTIAL | NON-EXPANSION | VALID | | |
| a9 | s9 | PERMANENT | NON-SEQUENTIAL | NON-EXPANSION | VALID | | |
| a10 | s10 | – | SEQUENTIAL | NON-EXPANSION | VALID | | |
| a11 | s11 | – | NON-SEQUENTIAL | EXPANSION | VALID | | |
| a12 | s12 | – | NON-SEQUENTIAL | RESERVED | INVALID | | |
| a13 | s13 | – | NON-SEQUENTIAL | NON-EXPANSION | INVALID | | |
| a14 | s14 | – | NON-SEQUENTIAL | NON-EXPANSION | INVALID | SECURE | |
| a15 | s15 | – | NON-SEQUENTIAL | NON-EXPANSION | VALID | SECURE | |
| a16 | s16 | – | NON-SEQUENTIAL | NON-EXPANSION | VALID | | FAST |

FIG. 4

| START ADDRESS OF ALLOCATION REGION | SIZE OF ALLOCATION REGION | CONTEXT PROPERTY INFORMATION | | | | | |
|---|---|---|---|---|---|---|---|
| | | EFFECTIVE PERIOD PROPERTY | SEQUENTIAL/NON-SEQUENTIAL ACCESS PROPERTY | EXPANSION/NON-EXPANSION PROPERTY | VALID/INVALID PROPERTY | SECURITY PROPERTY | SPEED PROPERTY |
| a1 | s1 | TEMPORARY | NON-SEQUENTIAL | NON-EXPANSION | VALID | | |
| a2 | s2 | ONE DAY | NON-SEQUENTIAL | NON-EXPANSION | VALID | | |
| a3 | s3 | ONE DAY | NON-SEQUENTIAL | NON-EXPANSION | VALID | | |
| a4 | s4 | TEMPORARY | NON-SEQUENTIAL | NON-EXPANSION | VALID | | |
| a5 | s5 | TEMPORARY | NON-SEQUENTIAL | NON-EXPANSION | VALID | | |
| a6 | s6 | PERMANENT | NON-SEQUENTIAL | NON-EXPANSION | VALID | | |
| a7 | s7 | TEMPORARY | NON-SEQUENTIAL | NON-EXPANSION | VALID | | |
| a8 | s8 | ONE DAY | NON-SEQUENTIAL | NON-EXPANSION | VALID | | |
| a9 | s9 | PERMANENT | NON-SEQUENTIAL | NON-EXPANSION | VALID | | |
| a10 | s10 | — | SEQUENTIAL | NON-EXPANSION | VALID | | |
| a11 | s11 | — | NON-SEQUENTIAL | EXPANSION | VALID | | |
| a12 | s12 | — | NON-SEQUENTIAL | RESERVED | INVALID | | |
| a13 | s13 | — | NON-SEQUENTIAL | NON-EXPANSION | INVALID | | |
| a14 | s14 | — | NON-SEQUENTIAL | NON-EXPANSION | INVALID | SECURE | |
| a15 | s15 | — | NON-SEQUENTIAL | NON-EXPANSION | VALID | SECURE | |
| a16 | s16 | — | NON-SEQUENTIAL | NON-EXPANSION | VALID | | FAST |

US 10,698,807 B2

COMPUTER SYSTEM AND METHOD OF OPERATING THE SAME

CROSS-REFERENCE TO RELATED APPLICATION

Korean Patent Application No. 10-2016-0152965, filed on Nov. 16, 2016, and entitled, "Computer System and Method of Operating the Same," is incorporated by reference herein in its entirety.

BACKGROUND

1. Field

One or more embodiments described herein relate to a computer system and a method for operating a computer system.

2. Description of the Related Art

Many factors affect the performance of computer systems. Examples include capacity, throughput, and access speed of a main memory or system memory. The main memory may be a volatile memory, e.g., a dynamic random access memory (DRAM). A DRAM has high density due to its structural simplicity. However, DRAMs are expensive and consume significant amounts of power due to a refresh operation.

A non-volatile memory does not lose data when powered off and has lower power consumption, higher density, and is cheaper than a DRAM. However, a non-volatile memory has a lower access speed and finite program/erase cycles than a DRAM.

SUMMARY

In accordance with one or more embodiments, a computer system including a main memory device including a non-volatile memory and a memory controller to control the non-volatile memory; and a processor connected to the main memory device, the processor to execute an application program loaded to the non-volatile memory and provide the memory controller with a command including context property information of an allocation region, wherein the memory controller is to receive the command and to control the non-volatile memory based on the context property information.

In accordance with one or more other embodiments, a method for operating a computer system includes providing a command to a memory controller of a main memory device, the command including context property information of an allocation region, wherein providing the command is performed by a processor; and receiving the command and managing a non-volatile memory of the main memory device based on the context property information, wherein receiving the command and managing the non-volatile memory are performed by the memory controller.

In accordance with one or more other embodiments, an apparatus includes an interface and a processor to provide a command to a memory controller of a non-volatile memory through the interface, the command including context property information of an allocation region in the non-volatile memory, the context property information indicating at least one property to control the memory controller in designating the allocation region in the non-volatile memory.

BRIEF DESCRIPTION OF THE DRAWINGS

Features will become apparent to those of skill in the art by describing in detail exemplary embodiments with reference to the attached drawings in which:

FIG. 4 illustrates an embodiment of a context property table.

DETAILED DESCRIPTION

Figure 1:
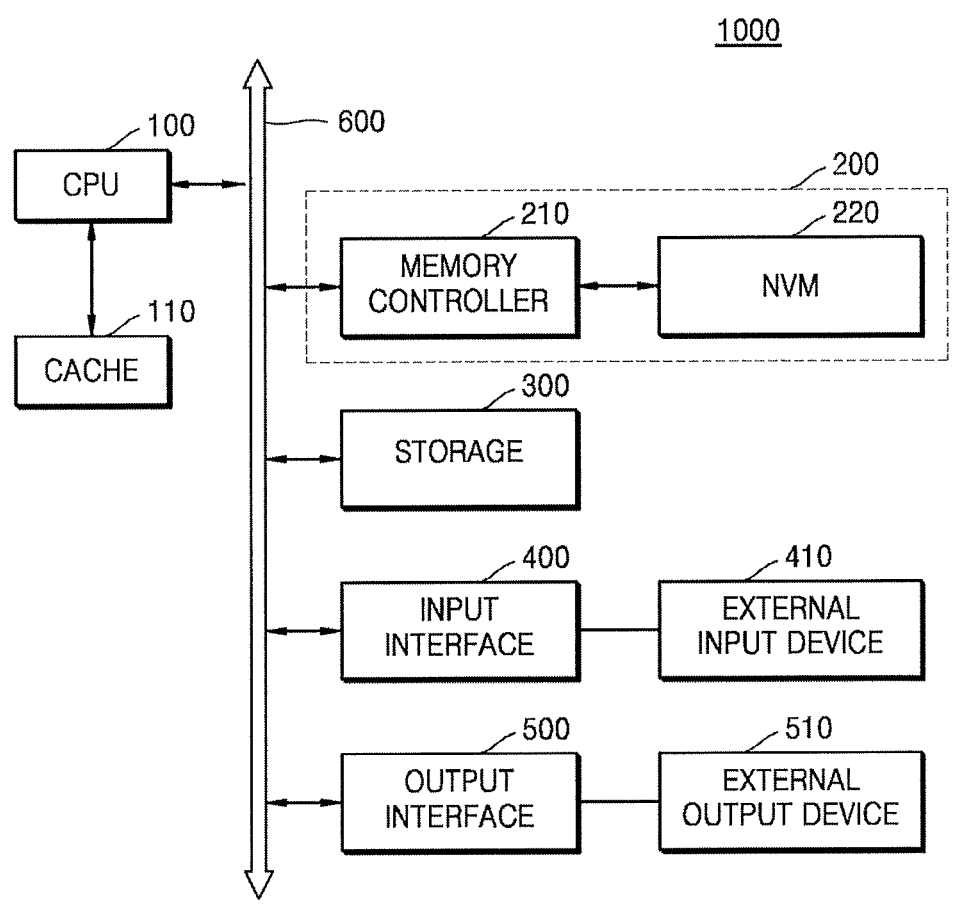
FIG. 1 illustrates an embodiment of a computer system.

FIG. 1 illustrates an embodiment of a computer system 1000 which may be a general-use or specific-use computer system. Examples include but are not limited to a main frame computer, a server computer, a personal computer, a mobile device or a programmable household appliance.

The computer system 1000 may include a processor 100 (e.g., a central processing unit (CPU)), a main memory device 200, a storage 300, an input interface 400, and an output interface 500 that are electrically connected to a system bus 600. According to an example embodiment, the computer system 1000 may further include a cache memory 110 connected to the processor 100.

The main memory device 200 includes a non-volatile memory (NVM) 220. In at least one embodiment, a memory may refer to a storage medium (e.g., an operating memory or a cache memory) in which the computer system 1000 temporarily stores data for a temporary period of time. The main memory device 200 may store data in file system formats or may also have read-only space to store operating system programs.

When the processor 100 executes an application program, at least a portion of the application program may be read from the storage 300 and loaded to the non-volatile memory 220 of the main memory device 200. The processor 100 may, for example, be AMD® Athlon®, Duron® and Opteron® processors; an ARM® application, embedded and secure processors; IBM® and Motorola® DragonBall® and PowerPC® processors; IBM and Sony® Cell processors; Intel®, Celeron®, Core (2) Duo®, Core i3, Core i5, Core i7, Itanium®, Pentium®, Xeon®, and XScale® processors; or similar processors to name a few. The processor 100 may include a dual-core microprocessor, a multi-core processor, or other multi-processor architectures.

According to an example embodiment, the main memory device 200 may include the non-volatile memory (NVM) 220 and a memory controller 210 for controlling the non-volatile memory 220. The processor 100 may provide a command to the memory controller 210. The memory controller 210 may control and manage the non-volatile memory 220 based on the command from the processor 100.

The memory controller 210 may convert a logical address of data to a physical address based on the command from the processor 100.

Data stored in the main memory device 200 including the non-volatile memory 220 is retained. This characteristic is similar to that of a flash memory used in a solid state drive (SSD) and is different from those of SRAM or DRAM. In an idle state, the main memory device 200 may consume less power than volatile memory devices such as SRAM or DRAM. In addition, the main memory device 200 may be randomly accessible like SRAM or a DRAM.

The main memory device 200 is rewritable and erasable at a level of granularity less than the level of a flash memory of an SSD. For example, the main memory device 200 is rewritable or erasable at a byte level, where a flash memory of an SSD is rewritable or erasable in block units at a time. A minimum block size of a NOR FLASH is 64 Kbytes, and a minimum block size of a NAND FLASH is 16 Kbytes.

The main memory device 200 has a faster writing speed than non-volatile storage technology such as a flash memory. The main memory device 200 has a high reading speed. For example, the main memory device 200 has a faster reading speed than a flash memory and may have a similar reading speed to a reading speed of DRAM. Data may be rewritten directly to the main memory device 200. For example, the main memory device 200 may not have to be erased before rewriting data thereto, as in the case of a flash memory used in an SSD. The writing durability of the main memory device 200 is several hundreds or thousands times greater than that of a flash memory used in an SSD or a boot ROM.

According to an example embodiment, a command provided by the processor 100 to the memory controller 210 may include context property information of an allocation region. The memory controller 210 may manage the non-volatile memory 220 using the context property information in the command.

The storage 300 may include at least one of a hard disk drive (HDD) or an SSD. In at least one embodiment, a storage may refer to a storage medium to which the computer system 1000 stores data for a long period. The storage 300 may store, for example, an operating system (OS), an application program, program data, or other code.

The input interface 400 may be connected to an external input device 410. According to an example embodiment, the external input device 410 may be, for example, a keyboard, a mouse, a microphone, or a scanner. A user may input a command, data, and information to computer system 1000 via external input device 410.

The output interface 500 may be connected to an external output device 510. According to an example embodiment, the external output device 510 may be, for example, a monitor, a printer, or a speaker. A result of executing and processing a user command by the computer system 1000 is displayed on the external output device 510. In one example embodiment, the computer system 1000 may further include an application chipset, a camera image processor (CIS), a modem, and/or other features.

Figure 2:
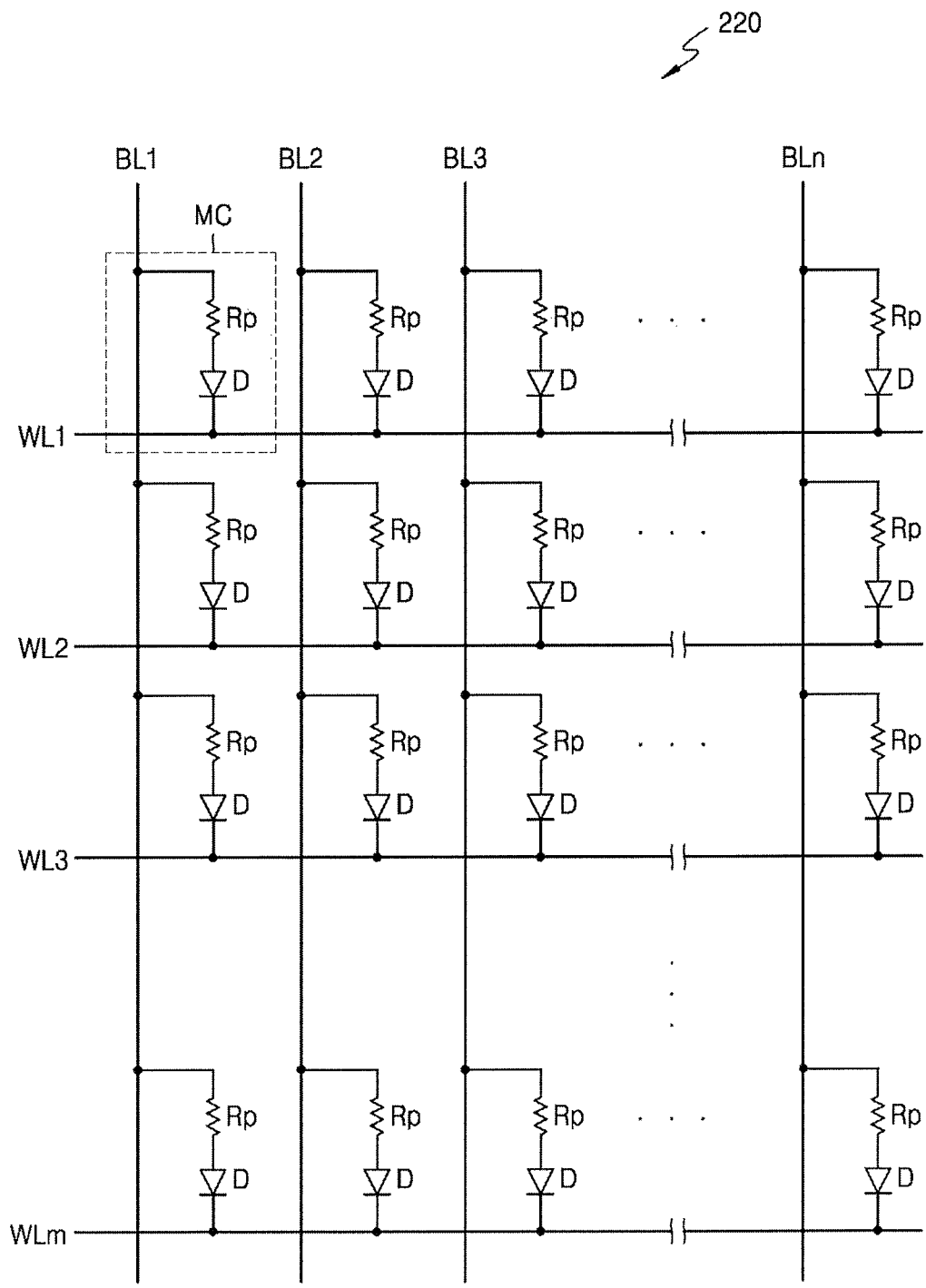
FIG. 2 illustrates an embodiment of a memory cell array of a non-volatile memory.

FIG. 2 illustrates an embodiment of a memory cell array, which, for example, may be included in the non-volatile memory 220 of FIG. 1. Referring to FIG. 2, the memory cell array may include word lines WL1 through WLm, bit lines BL1 through BLn, and memory cells MC. The memory cells MC may be at locations where the word lines WL1 through WLm and the bit lines BL1 through BLn cross each other.

According to an example embodiment, each memory cell MC may include a memory device Rp and a selection device D. The memory device Rp is connected to one of the bit lines BL1 through BLn and the selection device D. The selection device D is between the memory device Rp and one of the word lines WL1 through WLm.

The memory device Rp may be a variable resistor device that switches between different resistance states based on an applied electric pulse. In one example, embodiment, a variable resistor device may include a phase-change material having a crystalline state which changes based on the amount of current. Examples of the phase-change material include but are not limited to GeSbTe, GeTeAs, SnTeSn, GeTe, SbTe, SeTeSn, GeTeSe, SbSeBi, GeBiTe, GeTeTi, InSe, GaTeSe, and/or InSbTe.

The phase-change material may have different states based on temperature. For example, the different states may include an amorphous state with a relatively high resistance and a crystalline state with a relatively low resistance. The phase-change material may change phase, for example, based on Joule heat generated according to the amount of current flowing. Joule heat may be generated, for example, in proportion to the specific resistance of the phase-change material and the amount of time the current is supplied. Data may be written to and read from the memory device Rp based on the phase-change characteristics. The non-volatile memory 220 that is configured based on phase-change material may be referred to as a phase change random access memory (PRAM).

In one example embodiment, instead of a phase-change material, the memory device Rp may include perovskite compounds, transition metal oxides, magnetic materials, ferromagnetic materials, or antiferromagnetic materials. The non-volatile memory 220 may be referred to as resistive random access memory (RRAM) when a variable resistance material such as a complex metal oxide is used and may be referred to as magnetic random access memory (MRAM) when a ferromagnetic material is used.

According to an example embodiment, the selection device D may be connected between one of the word lines WL1 through WLm and the memory device Rp, and may control the supply of current to the memory device Rp based on the voltage of one or more of the word lines WL1 through WLm.

The selection device D may be, for example, a PN junction diode or a PIN junction diode. The diode may have an anode connected to the memory device Rp and a cathode connected to the word lines WL1 through WLm. When the voltage difference between the anode and the cathode of the diode is greater than a threshold voltage of the diode, the diode may be turned on to supply a current to the memory device Rp.

In one example embodiment, the selection device D may be a metal oxide semiconductor (MOS) transistor, e.g., an NMOS transistor. The word lines WL1 through WLm may be connected to a gate of the NMOS transistor. Current supply to the memory device Rp may be controlled based on the voltage of one or more of the word lines WL1 through WLm. In one example embodiment, the selection device D may be a bipolar junction transistor (BJT) having a pnp or npn structure.

FIG. 2 illustrates a memory cell array that includes variable resistance memory devices Rp. In one example embodiment, the non-volatile memory 220 may include a memory cell array including memory cells having a magnetic tunnel junction (MTJ) device with magnetic materials. The non-volatile memory 220 may be referred to as, for example, spin transfer torque magneto-resistive random access memory (STT-MRAM).

Memory cells of STT-MRAM may include a MTJ device and a cell transistor. The MTJ device may include a pinned layer and a free layer, with a tunnel layer therebetween. The magnetization direction of the pinned layer is fixed. The magnetization direction of the free layer may be the same as or reverse to that of the pinned layer based on one or more conditions. In order to pin a magnetization direction of the pinned layer, for example, an anti-ferromagnetic layer may be further included.

The cell transistor may have a gate connected to a word line, an electrode connected to a bit line via the MTJ device, and another electrode connected to a source line. To perform a write operation of the STT-MRAM, a logical high voltage may be applied to a word line to turn on the cell transistor. Data may be written to the MTJ device by applying a write current between a bit line and a source line. To perform a read operation of the STT-MRAM, a logical high voltage may be applied to a word line to turn on the cell transistor. Read current may be applied between a bit line and source line to detect a resistance value of the MTJ device. As a result, data stored in the MTJ device is read.

Figure 3:
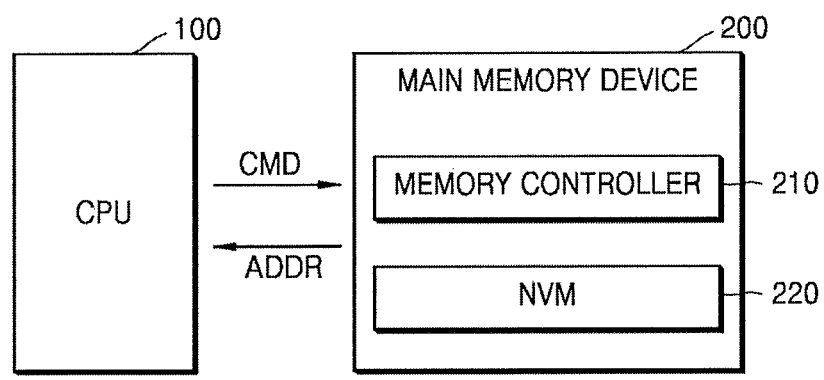
FIG. 3 illustrates another embodiment of a computer system.

FIG. 3 illustrates an embodiment of a computer system which includes a processor 100 and a main memory device 200. The main memory device 200 may include a non-volatile memory 220 and a memory controller 210 for controlling the non-volatile memory 220.

The processor 100 may be connected to the main memory device 200 and may execute an application program loaded to the main memory device 200. The processor 100 provides the memory controller 210 with a command CMD including context property information of an allocation region. The memory controller 210 receives the command CMD and controls the non-volatile memory 220 using the context property information.

The main memory device 200 may provide the processor 100 with memory space to drive an application program, and may temporarily store the result of a calculation performed by the processor 100. The main memory device 200 includes the non-volatile memory 220 which retains stored data when power is turned off. The non-volatile memory 220 may be, for example, one of PRAM, RRAM, or STT-MRAM. In an example embodiment, main memory device 200 may further include a volatile memory.

The processor 100 uses the main memory device 200 to execute an application program. The processor 100 loads the application program to the main memory device 200 and temporarily stores data in the main memory device 200 to execute and process the application program. The processor 100 provides a command to the memory controller 210 in the main memory device 200 and may access the non-volatile memory 220 in the main memory device 200 by receiving a processing result from the memory controller 210.

Commands sent from the processor 100 to the main memory device 200 may include a write command and a read command. Before providing a write command or a read command, the processor 100 may provide a memory allocation command to the main memory device 200. The processor 100 provides a write command to store data in a region allocated to the main memory device 200, and provides a read command to read data stored in the allocated region of the main memory device 200. The main memory device 200 may perform processing passively based on a command from processor 100.

The processor 100 may store, track, or access information relating to the number of times the allocated region has been accessed, the relationship between or among allocated regions, and changes in size of allocated regions. The processor 100 provides commands based on application program codes. Thus, an engineer who designed program code may be notified of at least the above information. In one example embodiment, the main memory device 200 may operate passively based on a command from the processor 100 and thus may not store, track, or process information as described above.

According to an example embodiment, the processor 100 incorporates context property information of an allocation region into a command CMD and may provide the command CMD to the memory controller 210.

Context property information may include, for example, an effective period property of an allocation region, a sequential/non-sequential access property, an expansion/non-expansion property of an allocation region, a valid/invalid property of an allocation region, a security property of an allocation region, and/or a speed property of an allocation.

An allocation region may refer to, for example, a region to be allocated in the non-volatile memory 220 based on a memory allocation command CMD from the processor 100 to the memory controller 210 or an actually allocated region in the non-volatile memory 220 based on the memory allocation command CMD. A command CMD sent from the processor 100 to the memory controller 210 may include, for example, context property information of an allocation region. An allocation region may refer to, for example, a region set by the processor 100 to be allocated in the non-volatile memory 220. Context property information of an allocation region may refer to, for example, context property information of a region to be allocated.

The memory controller 210 may control the non-volatile memory 220 based on context property information. In one example embodiment, the context property information may refer to respective items of context property information of respective regions allocated in the non-volatile memory 220. The memory controller 210 may allocate an allocation region based on a command CMD from the processor 100. Thus, when an allocation region is generated, context property information of a region set to be allocated and context property information of the allocated region may be the same.

According to some example embodiments, the processor 100 may modify context property information of an allocated region in the non-volatile memory 220. For example, the processor 100 may incorporate context property information of the allocation region into a command CMD and then provide the command CMD to the memory controller 210. Thus, in at least one example embodiment, an allocation region may refer to a region that is already allocated to the non-volatile memory 220.

According to an example embodiment, processor 100 may incorporate context property information of an allocation region (for example, a region to be allocated) in a memory allocation command CMD and may provide the memory allocation command CMD to the memory controller 210. The memory allocation command CMD may include, for example, information indicative of the size of the allocation region (for example, the size of a region to be allocated). The memory controller 210 may allocate a first allocation region in the non-volatile memory 220 based on the memory allocation command CMD, for example, by referring to context property information. The memory controller 210 may return a start address ADDR of the first allocation region to the processor 100. The first allocation region may refer to, for example, a region in the non-volatile memory 220 actually allocated based on the memory allocation command CMD.

According to an example embodiment, the memory controller 210 may store a start address, a size, and/or context property information of the first allocation region in a context property table. The context property table may be stored, for example, in the non-volatile memory 220. When the main memory device 200 includes a volatile memory, the context property table may also be stored in a volatile memory.

In at least one example embodiment, a start address, a size, and context property information of each allocation region may be stored in a context property table. The context property table may not only store information corresponding to allocation regions allocated to the processor 100, but also store information corresponding to other regions. For example, when the computer system 1000 has just started and the processor 100 has not yet provided a memory allocation command, information indicating that the entire memory region has not yet been allocated may be stored in a context property table in order to control the non-volatile memory 220. In one example embodiment, a reservation property may be stored for some memory regions in preparation for expansion of adjacent allocation regions. A memory region having a reservation property may not be allocated to the processor 100 and, thus, may not be an allocation region. Instead, information corresponding to this memory region may be stored in the context property table and controlled by the memory controller 210.

Figure 5:
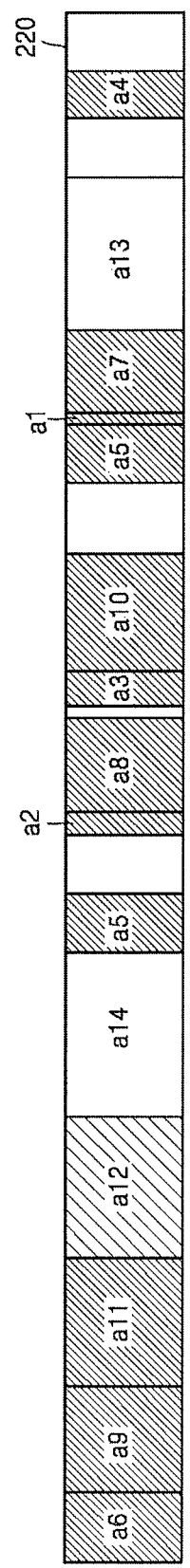
FIG. 5 illustrates an embodiment of a non-volatile memory in which allocation regions are allocated based on the context property table.

FIG. 4 illustrates a context property table according to an example embodiment. FIG. 5 illustrates an embodiment of a non-volatile memory to which allocation regions are allocated based on the context property table in FIG. 4.

The context property table of FIG. 4 stores context property information which includes an effective period property, a sequential/non-sequential access property, an expansion/non-expansion property, a valid/invalid property, a security property, and a speed property. The context property information may be different in another embodiment, e.g., properties may be added to the context property information in FIG. 4 or one or more of the properties in FIG. 4 may be omitted. An effective period property will be described with reference to FIGS. 4 and 5 as an example.

The processor 100 provides a memory allocation command CMD to the memory controller 210. The memory allocation command CMD indicates the size s1 and an effective period property (e.g., temporary) of an allocation region a1. The memory controller 210 may allocate the allocation region a1 in the non-volatile memory 220, for example, as illustrated in FIG. 5, based on the memory allocation command CMD. The location of the allocation region a1 in the non-volatile memory 220 is one example.

The processor 100 may provide another memory allocation command CMD to the memory controller 210. This other memory allocation command CMD nay indicate the size s2 and an effective period property (e.g., one day) of an allocation region a2. The memory controller 210 may allocate the allocation region a2 in the non-volatile memory 220 as illustrated in FIG. 5, based on this memory allocation command CMD.

The effective period property of the allocation region a2 (e.g., one day) may be different from the effective period property of the allocation region a1 (e.g., temporary). In one embodiment, the memory controller 210 may allocate the allocation region a2 to not be physically adjacent to the allocation region a1. In at least one embodiment t, two regions that are physically adjacent may correspond to the case where physical addresses of the two regions are adjacent to each other in the non-volatile memory 220.

The effective period property being one day is just an example. The effective period property may be a different preset period in another embodiment, e.g., a week, a month, ten days, twelve hours, or a different period of time. Allocation regions a3 to a5 may be allocated, for example, based on memory allocation commands CMD from the processor 100.

The processor 100 may provide another memory allocation command CMD to the memory controller 210. This memory allocation command CMD may indicate the size s6 and effective period property (e.g., permanent) of an allocation region a6. The memory controller 210 may allocate the allocation region a6 in the non-volatile memory 220, as illustrated in FIG. 5, based on this memory allocation command CMD. The effective period property of the allocation region a6 (e.g., permanent) may be different from the effective period properties of allocation regions a1 through a5 (e.g., temporary and one day). Thus, the memory controller 210 may allocate the allocation region a6 to not be physically adjacent to allocation regions a1 through a5.

The processor 100 may provide another memory allocation command CMD to the memory controller 210. This memory allocation command CMD may indicate the size s7 and an effective period property (e.g., temporary) of an allocation region a7. The memory controller 210 may allocate the allocation region a7 in the non-volatile memory 220, as illustrated in FIG. 5, based on the memory allocation command CMD, for example, by referring to the context property table in FIG. 4. The effective period property of the allocation region a7 (e.g., temporary) may be the same as the effective period property of the allocation region a1 (e.g., temporary). Thus, the memory controller 210 may allocate the allocation region a7 to be physically adjacently to the allocation region a1.

The processor 100 may provide another memory allocation command CMD to the memory controller 210. This memory allocation command CMD may indicate a size s8 and an effective period property (e.g., one day) of an allocation region a8. The memory controller 210 may allocates the allocation region a8 in the non-volatile memory 220, as illustrated in FIG. 5, based on the memory allocation command CMD, for example, by referring to the context property table in FIG. 4. The effective period property of the allocation region a8 (e.g., one day) may be the same as the effective period properties of the allocation regions a2 and a3 (e.g., one day). In this case, the memory controller 210 may allocate the allocation region a8 to be physically adjacently to the allocation regions a2 and a3.

The processor 100 provides another memory allocation command CMD to the memory controller 210. This memory allocation command CMD may indicate a size s9 and an effective period property (e.g., permanent) of an allocation region a9. The memory controller 210 may allocate the allocation region a9 in the non-volatile memory 220, as illustrated in FIG. 5, based on the memory allocation command CMD, for example, by referring to the context property table of FIG. 4. The effective period property of the allocation region a9 (e.g., permanent) may be identical to the effective period property of the allocation region a6 (e.g., permanent). In this case, the memory controller 210 may allocate the allocation region a9 to be physically adjacently to the allocation region a6.

The memory controller 210 may allocate a new region adjacent to allocation regions, having identical effective period properties as that of the newly allocated region, by referring to the context property table. Accordingly, allocation of allocation regions having similar effective period properties may be revoked around the same time. For example, allocation regions having a permanent effective period property may be arranged closely on a portion of the non-volatile memory 220. Allocation regions having a temporary effective period property may be arranged closely on another portion. When the allocation regions having a temporary effective period property are allocation-revoked to create empty space, a new allocation region of a greater size may be allocated to that empty space. This may increase the efficiency of use of the memory space.

When the allocation regions having a permanent effective period property and allocation regions having a temporary effective period property are mixed, empty space is small, even when the allocation regions having a temporary' effective period property are allocation-revoked. Thus, space may be efficiently used. For example, fragmentation is generated as the allocation regions are allocation-revoked, and as physically adjacent regions are allocation-revoked around the same time. An effect of spontaneous compaction may therefore be realized. Accordingly, space of the non-volatile memory 220 may be used more efficiently.

Next, the sequential/non-sequential access property will be described. The processor 100 may provide a memory allocation command CMD to the memory controller 210. This memory allocation command CMD may indicate a size s10 and a sequential/non-sequential access property (e.g., sequential) of an allocation region a10. The memory controller 210 may allocate, as the allocation region a10, a physically continuous region in the non-volatile memory 220, as illustrated in FIG. 5, based on the memory allocation command CMD. A sequential access property may indicate that the processor 100 is highly likely to access an address in a logically sequential order.

The processor 100 accesses the non-volatile memory 220 via a logical address. Even when logical addresses of allocation regions are sequential, a plurality of empty memory regions may be connected to one another to form a single allocation region because of the absence of a sufficient empty memory region in the non-volatile memory 220. In this case, physical addresses are split into several addresses, thus constituting a non-sequential access property. In this case, even when the processor 100 sequentially accesses the non-volatile memory 220 using logical addresses, in reality, the non-volatile memory 220 is non-sequentially accessed and at a lower access speed.

The processor 100 is able to determine that a region to be allocated during memory allocation (for example, an allocation region) has a sequential access property. Thus, the processor 100 may provide information about the sequential access property to the memory controller 210 at the point of memory allocation. The memory controller 210 may allocate, as an allocation region (for example, the allocation region a10), a physically continuous region based on information about the sequential access property.

According to an example embodiment, when there is no physically continuous region corresponding to the size of an allocation region in a memory allocation command CMD, the memory controller 210 may perform an operation of relocating regions in use between empty regions in order to provide a physically continuous region. By relocating regions in use, the memory controller 210 may secure a physically continuous region corresponding to a size of an allocation region in the memory allocation command CMD and allocate the secured region as an allocation region.

Next, the expansion/non-expansion access property will be described. The processor 100 provides a memory allocation command CMD to the memory controller 210. This memory allocation command CMD may indicate the size s11 and an expansion/non-expansion property (e.g., expansion) of an allocation region a11. The memory controller 210 may allocate the allocation region a11 to a region in the non-volatile memory 220 that is physically continuous and larger than an allocation region, as illustrated in FIG. 5, based on the memory allocation command CMD. An expansion property may indicate that processor 100 is likely to expand a currently provided size at a later time.

For example, the processor 100 may provide the memory controller 210 with a memory allocation command CMD including an expansion property when memory allocation is performed for files with a gradually increasing size over time, such as a log file. When a physically adjacent region is allocated for a different purpose, an allocation region is to be physically split within the non-volatile memory 220. This lowers access speed as described above. In order to prevent this problem, when an allocation region having an expansion possibility is allocated, information indicating the possibility of expansion (e.g., expansion property information) is provided to the memory controller 210 at the point of allocation so as to allocate an allocation region in a sufficient space, e.g., in a relatively larger empty space than a currently needed size.

According to an example embodiment, the memory controller 210 may update the expansion/non-expansion property of a region adjacent to the allocation region a11 having the expansion property (e.g., region a12 of FIG. 5) to reserved property. The region a12 is to be included in the allocation region a11 when the allocation region a11 is expanded later. Before the allocation region a11 is allocated, the region a12 has been an empty region (or non-use region) and acquired the reserved property as the allocation region a11 having an expansion property is allocated. Data in the region a12 may be meaningless. Thus, a valid/invalid property thereof may be invalid. When space of the non-volatile memory 220 runs short, the processor 100 may allocate the region a12 to other processes or threads.

Next, the valid/invalid property will be described. The processor 100 provides a memory allocation command CMD regarding the allocation regions a1 through a11 to the memory controller 210. The memory controller 210 allocates the allocation regions a1 through a11 in the non-volatile memory controller 220 as illustrated in the context property table of FIG. 4, based on the memory allocation command CMD, and may update the valid/invalid property of the allocation regions a1 through a11 to valid.

The memory controller 210 may search valid/invalid property fields of the context property table of FIG. 5 to determine which allocation region is currently in use and which allocation region is no longer used.

The processor 100 may revoke allocation of an allocation region when the allocation region is no longer used. A command for revoking allocation of an allocation region is a memory revoke command. The processor 100 may provide the memory controller 210 with a memory revoke command that includes a start address of an allocation region, allocation of which is to be revoked. Based on the memory revoke command, the memory controller 210 may update the valid/invalid property of the allocation region to be allocation-revoked, to invalid in the context property table. The memory controller 210 may allocate the allocation-revoked allocation region to other processes or threads.

For example, as illustrated in FIG. 4, when the processor 100 intends to revoke allocation of an allocation region a13, the processor 100 may provide the memory controller 210 with a memory revoke command including a start address a13 of the allocation region a13 (for example, 'free'). The memory controller 210 may search the context property table for the start address a13 of the allocation region, based on the memory revoke command and may update the valid/invalid property of an allocation region corresponding to the start address a13 to invalid. As a result, as illustrated in FIG. 5, the allocation region a13 in the non-volatile memory 220 is modified to empty space (for example, no hatching) so as to be allocatable to other processes or threads.

The memory controller 210 may perform a wear leveling operation on non-volatile memory regions having a 'valid' property in the context property table.

The memory controller 210 may reduce an internal calculation processing amount by omitting internal calculation, for example, a wear leveling operation, with respect to allocation regions having an 'invalid' property. The non-volatile memory 220 typically has a finite program/erase cycle compared to DRAM. Accordingly, when data is stored in or erased from only particular memory cells in the non-volatile memory 220, errors may be caused as frequently accessed memory cells may become dead cells (e.g., cells incapable of storing data) and the main memory device 200 may spend a long time and a large amount of calculation to correct the errors. As a result, the entire main memory device 200 may become defective.

In order to prevent this problem, the memory controller 210 may perform a wear leveling operation so that storage and erasing of data is uniformly performed on memory cells. For example, locations of memory cells in which data is frequently updated and locations of memory cells that are seldom accessed may be exchanged or relocated so that memory cells are uniformly rewritten.

According to an example embodiment, the memory controller 210 may omit a wear leveling operation on allocation regions having an invalid property. Data in allocation regions having the invalid property is data that is no longer used. Thus, calculations to relocate unnecessary data do not have to be performed for a wear leaving operation.

According to another example embodiment, the memory controller 210 may relocate data of an allocation region having a high wear level to an allocation region having a low wear level and an invalid property. This may be performed to remove data in the allocation region having the invalid' property. A wear leveling operation may then be performed.

According to an example embodiment, because the non-volatile memory 220 does not lose data therein even when powered off, the memory controller 210 may actually delete data of the allocation region a13 based on a memory revoke command. For example, when revoking allocation of the allocation region a13, the processor 100 may provide the memory controller 210 with a memory revoke command (for example, 'free') including the start address a13 of the allocation region a13. The memory controller 210 may receive the memory revoke command to sense that the valid/invalid property in the context property information is modified to invalid.

Based on the memory revoke command, the memory controller 210 may search the context property table for the start address a13 of the allocation region a13 and update the valid/invalid property of the allocation region a13 corresponding to the start address a13 to invalid. In addition, based on the memory revoke command, the memory controller 210 may actually delete data of the allocation region a13 or store preset predetermined data (for example, '1111' or '0000') in the allocation region a13. By completely deleting invalid data in the non-volatile memory 220, the memory controller 210 may protect internally stored data even when the non-volatile memory 220 is stolen or hacked.

According to another example embodiment, allocation regions a14 and a15 have a security property. The allocation regions a14 and a15 may be encoded and stored in the non-volatile memory 220. The memory controller 210 may encode data when storing the data in the non-volatile memory 220 and decode the encoded data when reading the data from the non-volatile memory 220. Even when the valid/invalid property of the allocation region a14 is updated to invalid due to a memory revoke command or the like, the data in the allocation region a14 is encoded and thus secure. As a result, the data in the allocation region a14 may actually not be deleted.

According to another example embodiment, when the processor 100 provides a read command and a write command to the memory controller 210, the processor 100 may provide the read command and the write command by incorporating context property information into the read command and the write command. The memory controller 210 may control the non-volatile memory 220 based on the context property information. For example, the memory controller 210 may update the context property table based on the context property information.

Figure 6:
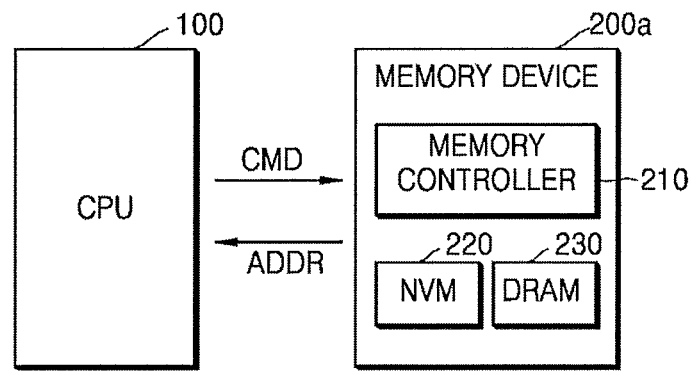
FIG. 6 illustrates another embodiment of a computer system.

FIG. 6 illustrates another embodiment of a computer system which includes a processor 100 and a main memory device 200a. The main memory device 200a may include a non-volatile memory 220, a volatile memory 230, and a memory controller 210 controlling the non-volatile memory 220 and the volatile memory 230.

The processor 100 may be connected to the main memory device 200 and execute an application program loaded to the main memory device 200. The processor 100 provides a command CMD, including context property information of an allocation region, to the memory controller 210. The memory controller 210 controls the non-volatile memory 220 using the context property information indicated in the command CMD. The application program may be loaded to the non-volatile memory 220 and the volatile memory 230.

According to an example embodiment, the processor 100 may incorporate context property information of an allocation region (for example, a region to be allocated) into a memory allocation command CMD and provide the same to the memory controller 210. The memory allocation command CMD also indicates the size of the allocation region (for example, a size of a region to be allocated). The memory controller 210 may allocate a first allocation region to one of the non-volatile memory 220 and the volatile memory 230 by referring to the context property information in the memory allocation command CMD. The memory controller 210 may return a start address ADDR of the first allocation region to the processor 100.

Context property information may be, for example, a speed property of an allocation region. The speed property may be related to an access frequency of an allocation region. When access frequency is high (e.g., above a predetermined threshold), the speed property may be considered to be fast. For example, in a repetitive statement of program code (for example, a for-loop), an allocation region corresponding to an increase variable (for example, i) will be repeatedly accessed. Thus, the speed property may be fast.

On the other hand, a file having a large file size (e.g., video) does not have high access frequency. Thus, the speed property thereof is unlikely to be fast. The memory controller 210 may allocate an allocation region a16 (e.g., see FIG. 4) having the speed property of fast to the volatile memory 230 and allocation regions without a speed property of fast to the non-volatile memory 220. By allocating an allocation region having a high access frequency to a medium having a fast access speed, the total system speed may be increased.

According an example embodiment, the memory controller 210 may store a start address ADDR, a size, and context property information of a first allocation region in the volatile memory 230 in the form of a context property table. The volatile memory 230 has a higher access speed and higher durability than the non-volatile memory 220, and is thus suitable to store data with a high access frequency. Accordingly, a context property table including a start address ADDR, a size, and context property information of a first allocation region which is highly likely to be frequently accessed may be stored in the volatile memory 230.

Besides a speed property of an allocation region, context property information may include an effective period property of an allocation region, a sequential/non-sequential access property of an allocation region, an expansion/non-expansion property of an allocation region, a valid/invalid property of an allocation region, and/or a security property of an allocation region. For example, the context property table in FIG. 4 may be stored in the volatile memory 230.

Figure 7:
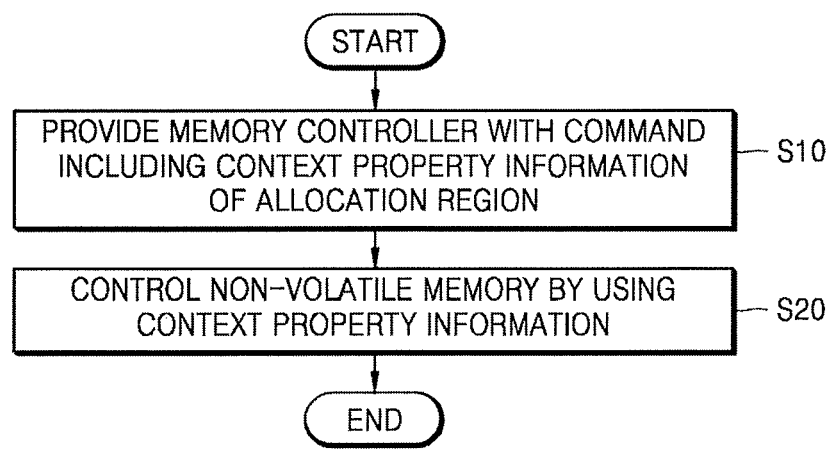
FIG. 7 illustrates an embodiment of a method for operating a computer system.

FIG. 7 illustrates an embodiment of a method for operating a computer system, which, for example, may corresponding to any of the embodiments of a computer system described herein.

Referring to FIG. 7, the processor 100 provides a command CMD to the memory controller 210 of the main memory device 200 in operation S10. The command CMD includes context property information of an allocation region. The memory controller 210 may receive the command CMD and control the non-volatile memory 220 of the main memory device 200 using the context property information in operation S20.

The processor 100 may be electrically connected to the main memory device 200 and execute an application program loaded to the main memory device 200. The processor 100 may access the non-volatile memory 220 in bytes. For example, the processor 100 may write or read data in bytes to or from the non-volatile memory 220. The processor 100 may rewrite data directly to the non-volatile memory 220. For example, unlike a flash memory of an SSD, the processor 100 may overwrite stored data with new data without deleting stored data before rewriting.

The main memory device 200 may provide the processor 100 with memory space for storing an application program and for temporarily storing results of calculations performed by the processor 100. The main memory device 200 includes the non-volatile memory 220 which stores data when powered off. The non-volatile memory 220 may be, for example, one of PRAM, RRAM, or STT-MRAM.

In operation S10, the processor 100 may provide a memory allocation command CMD, indicating (e.g., including information indicative of) size and context property information of an allocation region, to the memory controller 210. In operation S20, the memory controller 210 may allocate a first allocation region to the non-volatile memory 220 based on the command CMD. This may be accomplished, for example, by referring to the context property information and returning a start address ADDR of the first allocation region to the processor 100.

In accordance with at least one embodiment, an allocation region may correspond to a region to be allocated in the non-volatile memory 220 according to a memory allocation command CMD provided from the processor 100 to the memory controller 210, or an actually allocated region in the non-volatile memory 220 allocated according to the memory allocation command CMD. A first allocation region may have the same meaning as or may have a different meaning from an actually allocated region depending on the context. Unless there is a description contrary thereto, a first allocation region refers to a region that is actually allocated by the memory controller 210 in the non-volatile memory 220 based on the command CMD from the processor 100. For example, a first allocation region may not correspond to a region to be allocated. In addition, the first allocation region may represent actually allocated regions in the non-volatile memory 220 in at least one embodiment.

In operation S20, the memory controller 210 may store information indicative of a start address, a size, and context property information of the first allocation region in a context property table. The context property table may be stored in the non-volatile memory 220. The context property table may include, as illustrated in FIG. 4, information indicative of a start address, a size, and context property information of each of allocation regions.

According to some example embodiments, allocation regions allocated to the processor 100 may be stored in the context property table, as well as information corresponding to other regions. For example, the context property table may store information regarding an initial memory region or an expansion-reserved region.

The context property information may indicate a valid/invalid property.

According to an example embodiment, in operation S10, the processor 100 may provide the memory controller 210 with a memory allocation command CMD including information indicative of a size and context property information of an allocation region. In operation S20, the memory controller 210 may allocate a first allocation region in the non-volatile memory 220 based on the memory allocation command CMD. This may be accomplished by referring to the context property information and returning a start address ADDR of the first allocation region to the processor 100. In addition, the memory controller 210 may update the valid/invalid property regarding the first allocation region in the context property table to valid property based on the memory allocation command CMD.

According to an example embodiment, in operation S10, the processor 100 may provide the memory controller 210 with a memory revoke command CMD (for example, 'free') including information indicative of a start address of an allocation region that is to be allocation-revoked. In operation S20, the memory controller 210 may update the valid/invalid property of an allocation region having the start address in the context property table to invalid property based on the memory revoke command CMD. The memory controller 210 may allocate the allocation-revoked allocation region to other processes or threads.

According to an example embodiment, the memory controller 210 may perform a wear-leveling operation on non-volatile memory regions having an valid/invalid property of valid in the context property table. For example, the memory controller 210 may not perform internal calculation (e.g., a wear-leveling operation) on non-volatile memory regions having a valid/invalid property of invalid in the context property table.

According to another example embodiment, based on a memory revoke command, the memory controller 210 may search the context property table for a start address of an allocation region that is to be allocation-revoked, update the valid/invalid property of the allocation region to invalid, and delete data that is actually stored in the allocation region or store preset predetermined data in the allocation region. By completely deleting invalid data in the non-volatile memory 220, the memory controller 210 may protect internally stored data even when the non-volatile memory 220 is stolen or hacked.

The context property information may include an effective period property of an allocation region.

According to an example embodiment, in operation S10, the processor 100 may provide the memory controller 210 with a memory allocation command CMD including context property information including an effective period property of an allocation region. In operation S20, the memory controller 210 receives the memory allocation command CMD and refers to a context property table. The memory controller 210 searches the context property table for an allocation region having the same effective period property as the effective period property indicated in the memory allocation command CMD. The memory controller 210 allocates a first allocation region physically adjacently to an allocation region having the same effective period property as the effective period property indicated in the memory allocation command CMD, and returns a start address ADDR of the first allocation region to the processor 100.

According to an example embodiment, an effective period property may be one of temporary, permanent, and a preset period. The preset period may be, for example, one day, one week, one month, ten days, twelve hours, or another time period. As allocation regions having similar effective periods are allocated near to one another, the effect of spontaneous compaction may be generated. This may increase space efficiency of the non-volatile memory 220. The non-volatile memory 220 has a lower access speed and finite program/erase cycles compared with a volatile memory. Thus, relocation of the non-volatile memory 220 may be limited. Therefore, allocation regions may be efficiently allocated from the beginning.

Context property information may include a sequential/non-sequential access property of an allocation region.

According to an example embodiment, in operation S10, the processor 100 may provide the memory controller 210 with a memory allocation command CMD including context property information indicating a sequential/non-sequential access property of an allocation region. In operation S20, when the context property information indicated in the memory allocation command CMD has a sequential access property, the memory controller 210 may allocate a first allocation region to a physically continuous region in the non-volatile memory 220 and return a start address ADDR of the first allocation region to the processor 100.

Context property information may include an expansion/non-expansion property of the allocation region.

According to an example embodiment, in operation S10, the processor 100 may provide the memory controller 210 with a memory allocation command CMD including context property information indicating an expansion/non-expansion property of an allocation region. In operation S20, when the context property information indicated in the memory allocation command CMD has an expansion property, the memory controller 210 may allocate a first allocation region to a region in the non-volatile memory 220 that is physically continuous and is larger than a size to be allocated and return a start address ADDR of the first allocation region to the processor 100.

According to an example embodiment, in operation S20, the memory controller 210 may update the expansion/non-expansion property of a region adjacent to the first allocation region having the expansion property to reserved property. The adjacent region may be an empty or not-used region before the first allocation region is allocated.

The main memory device 200 may further include a volatile memory 230 controlled using the memory controller 210.

According to an example embodiment, in operation S10, the processor 100 may provide the memory controller 210 with a memory allocation command CMD including the context property information indicating a size of an allocation region and a speed property of the allocation region. In operation S20, the memory controller 210 may receive the memory allocation command CMD and allocate a first allocation region to the non-volatile memory 220 or the volatile memory 230 by referring to the speed property indicated in the memory allocation command CMD. For example, when the speed property is 'fast,' the memory controller 210 may allocate a first allocation region to the volatile memory 230 and, if not, to the non-volatile memory 220.

According to an example embodiment, the memory controller 210 may store a start address, a size, and context property information of the first allocation region in a context property table.

The context property table may be stored in the volatile memory 230. As the memory controller 210 frequently accesses the context property table to control and manage the volatile memory 230 and the non-volatile memory 220, it is efficient when the context property table is stored in the volatile memory 230 which has a relatively high access speed.

Figure 8A:
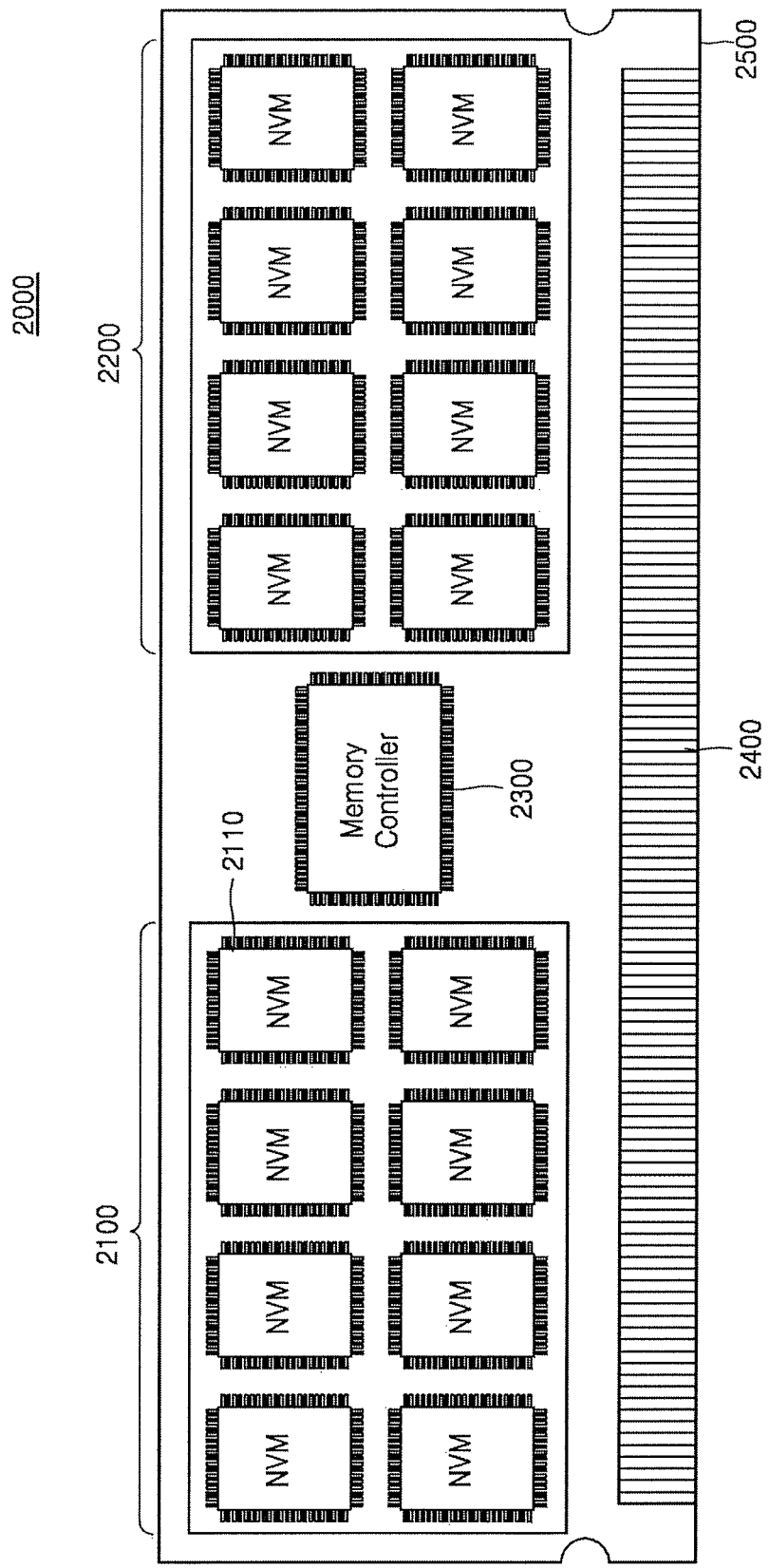
FIGS. 8A and 8B illustrates embodiments of a memory module.

FIG. 8A illustrates an embodiment of a memory module 2000 which may include non-volatile memory (NVM) chips 2110, a memory controller 2300, a connector 2400, and a printed circuit board 2500. The NVM chips 2110 may be arranged on a first side 2100 or on the first side 2100 and a second side 2200. The NVM chips 2110 may be coupled to an upper surface and a lower surface of the printed circuit board 2500.

The connector 2400 may be electrically connected to the NVM chips 2110 via conductive lines. The connector 2400 may be connected to a slot mounted in a main board of a computer system.

The memory controller 2300 may control writing and deleting of data of NVM cells in the NVM chips 2110. The memory controller 2300 may also be a separate chip on the printed circuit board 2500 as illustrated in FIG. 8A. In one embodiment, the memory controller memory 2300 may be inside the NVM chips 2110 or outside the memory module 2000.

The memory controller 2300 may receive a command, including context property information of an allocation region, from a processor 3110. The memory controller 2300 may control and manage NVM cells in the NVM chips 2110 based on the context property information in the command. The NVM chips 2110 may be one of PRAM chips, RRAM chips, or STT-MRAM chips.

According to an example embodiment, the memory controller 2300 may receive a memory allocation command, including a size and context property information of an allocation region (for example, a region to be allocated), from the processor 3110. The memory controller 2300 may receive the memory allocation command and allocate a first allocation region in the NVM chips 2110 by referring to the context property information. An actually allocated first allocation region is selected in accordance with the context property information. Thus, the amount of internal calculations for the memory module 2000 may be reduced and processing speed of the memory module 2000 may be increased.

Figure 8B:
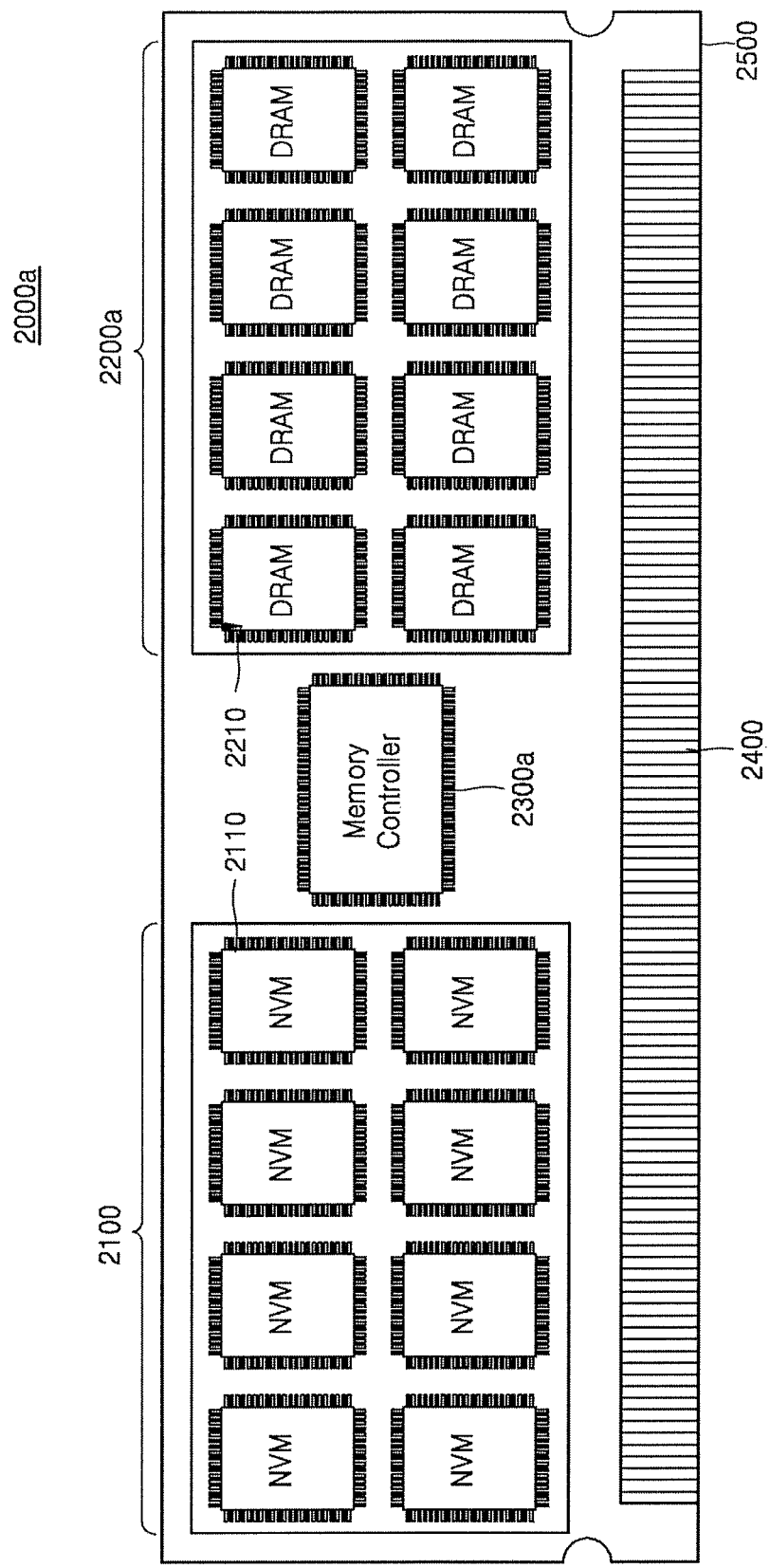

FIG. 8B illustrates another embodiment of a memory module 2000a which may include NVM chips 2110, DRAM chips 2210, a memory controller 2300a, a connector 2400, and a printed circuit board 2500. The NVM chips 2110 may be on a first side 2100 of the memory controller 2300a. The DRAM chips 2210 may be on a second side 2200 of the memory controller 2300a.

The arrangement, locations, and/or number of the NVM chips 2110 and the DRAM chips 2210 may be different in another embodiment. For example, the NVM chips 2110 may be on a first surface of the printed circuit board 2500 and the DRAM chips 2210 may be on a second surface of the printed circuit board 2500. In one embodiment, at least one DRAM chip 2210 may be adjacent to the memory controller 2300a to function as a cache memory of a higher level of the NVM chips 2110.

The connector 2400 is electrically connected to the NVM chips 2110 and the DRAM chips 2210 through conductive lines. The connector 2400 may be connected to a slot mounted in a main board of a computer system.

The memory controller 2300a may control writing and deleting of data of NVM cells in the NVM chips 2110 and writing, deleting, and refreshing of data of DRAM cells in the DRAM chips 2210. The memory controller 2300a may be a separate chip on the printed circuit board 2500, as illustrated in FIG. 8B. In one embodiment, the memory controller 2300a may be outside the memory module 2000a.

The memory controller 2300a may receive a command, including context property information of an allocation region, from the processor 3110. The memory controller 2300a may control and manage the NVM cells in the NVM chips 2110 and the DRAM cells in the DRAM chips 2210 based on the context property information in the command.

According to an example embodiment, the memory controller 2300a may receive a memory allocation command, including information indicative of a size and context property information of an allocation region, from the processor 3110. For example, the context property information may be a speed property of the allocation region. When a high access frequency of the processor 3110 with respect to an allocation region (for example, a region to be allocated) is expected, the speed property of the allocation region may be set as 'fast.' When a memory allocation command having a 'fast' speed property is received by the memory controller 2300a, the memory controller 2300a may allocate a first allocation region to the DRAM chips 2210. As the DRAM chips 2210 have a higher access speed than the NVM chips 2110, a high access frequency raises the total speed of the memory module 2000a. Accordingly, the total processing speed of a computer system including the memory module 2000a may be improved.

Figure 9:
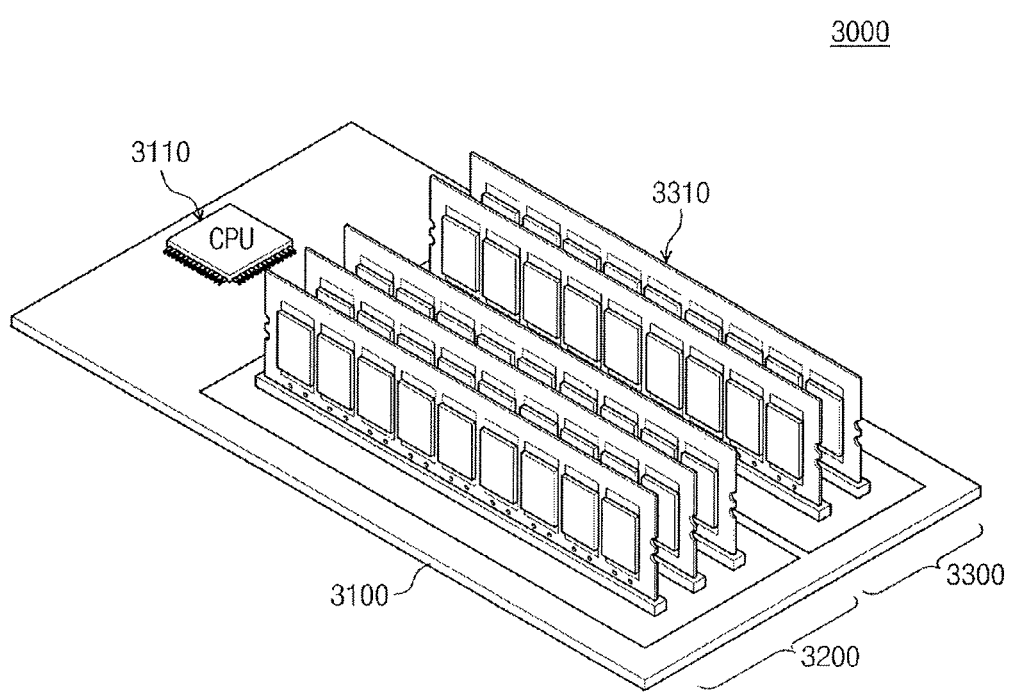
FIG. 9 illustrates an embodiment of a main board and memory modules.

FIG. 9 illustrates an embodiment of a main board 3100 and a plurality of memory modules 3310. Referring to FIG. 9, the main board 3100 is a substrate used to mount basic components in a computer system 3000. The memory modules 3310 may be mounted on the main board 3100 and may be connected to the main board 3100 through slots, for example, dual in-line memory module (DIMM) slots or sockets. For example, the memory modules 3310 may be connected to the main board 3100 after being grouped into different regions 3200 and 3300.

Various electronic components other than the processor 3110 and the memory modules 3310 may also be mounted on the main board 3100. The main board 3100 may have circuit patterns through which the processor 3110, the memory modules 3310, and the electronic components may be electrically connected to one another.

Each of the memory modules 3310 may include a non-volatile memory and a memory controller for controlling the non-volatile memory. Each of the memory modules 3310 may operate as a main memory device to drive the processor 3110. The processor 3110 provides the memory modules 3310 with a command including context property information of an allocation region. The memory controller of the memory modules 3310 receives a command from the processor 3110 and controls the non-volatile memory using the context property information in the command.

According to an example embodiment, the processor 3110 may provide the memory modules 3310 with a memory allocation command including a size and context property information of an allocation region. The memory modules 3310 may receive the memory allocation command and allocate an allocation region in the non-volatile memory according to the memory allocation command by referring to the context property information. Because the allocated allocation region is consistent with the context property information of the allocation region demanded by the processor 3110, an access speed of the processor 3110 with respect to the memory modules 3310 may be improved. Also, the amount of internal calculation processing of the memory modules 3310 may be reduced.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The controllers, calculators, processors, and other signal generating and signal processing features of the embodiments disclosed herein may be implemented in logic which, for example, may include hardware, software, or both. When implemented at least partially in hardware, the controllers, calculators, processors, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, calculators, processors, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned embodiments, a computer system and the method for operating the computer system accurately determines an agent (e.g., processor) for accessing a main memory device and how the agent will use the main memory device. The processor transmits context property information including information on usage conditions of the main memory device directly to a memory controller. As the memory controller uses the context property information, access speed between the processor and the main memory device may be increased and the amount of internal calculation processing in the main memory device may be reduced. Accordingly, overall performance of the computer system including the non-volatile main memory device may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A computer system comprising:
a main memory device including a non-volatile memory and a memory controller to control the non-volatile memory; and
a processor connected to the main memory device, the processor to execute an application program loaded to the non-volatile memory and to provide the memory controller with a command including context property information of an allocation region, wherein the memory controller is to receive the command and to control the non-volatile memory based on the context property information, and wherein
the context property information includes at least one of:
an effective property of each allocation region including a time period for maintaining data in each allocation region,
a sequential access property and a non-sequential access property of each allocation region,
an expansion property and a non-expansion property of each allocation region, and
a valid property and an invalid property.

2. The computer system as claimed in claim 1, wherein:
the command is a memory allocation command including information indicating a size and the context property information of the allocation region,
the memory controller is to allocate a first allocation region in the non-volatile memory by referring to the context property information based on the memory allocation command and to return information indicating a start address of the first allocation region to the processor.

3. The computer system as claimed in claim 2, wherein:
the memory controller is to store information indicating a start address, a size, and the context property information of the first allocation region in a context property table, and
the context property table includes information indicating a start address, a size, and context property information of each allocation region.

4. The computer system as claimed in claim 3, wherein the time period including a temporary period, a specific length period, and a permanent period, and
the memory controller is to allocate the first allocation region physically adjacently to an allocation region that has an identical effective period property to an effective period property of the first allocation region, the memory controller to allocate the first allocation region by referring to the context property table.

5. The computer system as claimed in claim 3, wherein the sequential access property indicating that the processor accesses an address in a logically sequential order, the non-sequential access property indicating that the processor does not access the address in the logically sequential order, and
when the first allocation region has a sequential access property based on the context property information, the memory controller is to allocate the first allocation region in a physically continuous region in the non-volatile memory.

6. The context property information as claimed in claim 3, wherein;
the expansion property indicating that a size of data in a corresponding allocation region is increased over time, the non-expansion property indicating that the size of the data in the corresponding allocation region is not increased over time, and
when the first allocation region has an expansion property based on the context property information, the memory controller is to allocate the first allocation region in a region in the non-volatile memory that is physically continuous and larger than a size to be allocated.

7. The computer system as claimed in claim 6, wherein the memory controller is to update the expansion property and the non-expansion property of the context property information, regarding the other regions besides the first allocation region in a region larger than the region to be allocated, to reserved property in the context property table.

8. The computer system as claimed in claim 3, wherein the validity property indicating that a corresponding allocation region is currently in use, the invalidity property indicating that the corresponding allocation region is no longer used, and
the memory controller is to update the valid property and the invalid property, with respect to the first allocation region in the context property table, based on the memory allocation command.

9. The computer system as claimed in claim 8, wherein:
the processor is to provide the memory controller with a memory revoke command including information indicating a start address of an allocation region that is to be allocation-revoked, and
the memory controller is to update the valid property and the invalid property of the allocation region having the start address in the context property table to an invalid property based on the memory revoke command.

10. The computer system as claimed in claim 8, wherein the memory controller is to perform a wear-leveling operation on non-volatile memory regions having a valid property in the context property table.

11. The computer system as claimed in claim 1, wherein:
the main memory device includes a volatile memory to be controlled by the memory controller, and
the command is a memory allocation command including information indicating a size of an allocation region and the context property information including a speed property of the allocation region, the speed property including an access frequency of a corresponding allocation region, and
the memory controller is to allocate a first allocation region to the non-volatile memory or the volatile memory based on the speed property.

12. The computer system as claimed in claim 11, wherein:
the memory controller is to store information indicating a start address and a size and the context property information of the first allocation region in a context property table, and
the context property table is stored in the volatile memory.

13. The computer system as claimed in claim 1, further comprising:
a storage to store the application program executed by the processor,
wherein the main memory device is to provide the processor with memory space to drive the application program and is to store a result of a calculation performed by the processor.

14. A method for operating a computer system, the method comprising:
providing a command to a memory controller of a main memory device, the command including context property information of an allocation region, wherein providing the command is performed by a processor; and
receiving the command and managing a non-volatile memory of the main memory device based on the context property information, wherein receiving the command and managing the non-volatile memory are performed by the memory controller, and wherein
the context property information includes at least one of:
an effective property of each allocation region including a time period for maintaining data in each allocation region,
a sequential access property and a non-sequential access property of each allocation region,
an expansion property and a non-expansion property of each allocation region, and
a valid property and an invalid property.

15. The method as claimed in claim 14, further comprising:
providing the memory controller with a memory allocation command including information indicating a size and the context property information of the allocation region, wherein providing the memory allocation command is performed by the processor; and
allocating a first allocation region in the non-volatile memory based on the context property information and returning information indicating a start address of the first allocation region to the processor, wherein allocating the first allocation region and returning the start address information are performed by the memory controller.

16. The method as claimed in claim 15, further comprising:
storing, by a memory controller, information indicating a start address and a size and the context property information of the first allocation region in a context property table in the non-volatile memory, wherein the context property table includes information indicating a start address and a size and context property information of a plurality of allocation regions.

* * * * *